Aug. 27, 1929.  F. W. NITARDY  1,725,964
PRODUCTION OF OILS
Filed Jan. 29, 1924
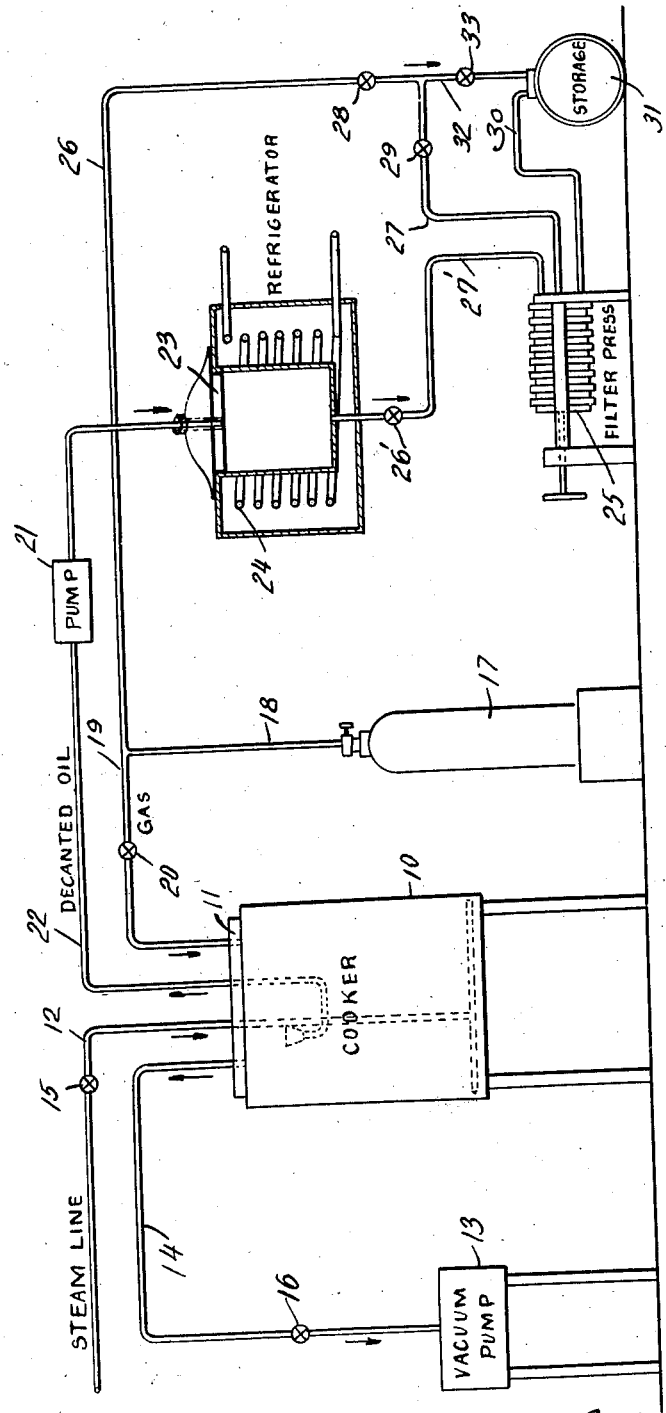

Patented Aug. 27, 1929.

1,725,964

UNITED STATES PATENT OFFICE.

FERDINAND W. NITARDY, OF BROOKLYN, NEW YORK, ASSIGNOR TO E. R. SQUIBB AND SONS, OF NEW YORK, N. Y., A CORPORATION OF NEW YORK.

PRODUCTION OF OILS.

Application filed January 29, 1924. Serial No. 689,364.

This invention relates to the rendering of oils from vitamin-containing material such as the livers of the cod and other fish. The method as hereinafter described is adapted to prevent the vitiation of their vitamin content and consequently to produce an oil having the highest possible medicinal and nutritive value.

Cod-liver oil has been known for a long time as a medicine and food, and the value of this oil has been ascribed more recently to the presence of vitamin A and possibly other vitamins. Vitamins are also found to greater or less extent in other fish oils.

The rendering of oils of this kind has been accomplished heretofore by two methods, rotting, which need not be discussed, and steam cooking. The cooking process is carried out under atmospheric or higher pressures, at temperatures of 100° C. or higher and without protection against oxidation by atmospheric oxygen. Vitamin A is destroyed by oxygen and high temperatures, particularly if cooking is prolonged, and consequently the oils heretofore found in the market have contained only a fraction of the vitamin A content of the material from which the oil is derived. The vitamin A content of the oil has been decreased also by the method of handling which permitted repeated contact of air with the oil subsequent to the recovery thereof.

It is the object of the present invention to provide a method of rendering and handling oil which ensures the maximum recovery of vitamin A and other valuable constituents therein and the preservation of these during the refining and storage of the oil.

Other objects and advantages of the invention will be apparent as it is better understood by reference to the following specification.

Vitamin A is not materially affected at temperatures below 100° C., even when cooking is relatively prolonged as is necessary to thoroughly disintegrate the oil-containing material. Temperatures as high as 104° to 105° C. can be used safely if oxygen is excluded and exposure to this temperature is brief. In carrying out the invention, therefore, the oil-containing material is cooked at temperatures below 105° C. and preferably below 100° C., and precautions are taken to avoid the presence of oxygen. This is accomplished easily in a steam-cooker operated under vacuum or reduced pressure. The degree of vacuum need not be great, it being sufficient to reduce the pressure to a point which permits boiling at about 70° C. The cooker must be closed to permit the maintenance of the reduced pressure and air is thus excluded during the cooking operation. Under such conditions vitamin A is not destroyed by heat or by the action of the oxygen of the atmosphere.

Cooking is continued until the oil-containing material is thoroughly disintegrated and the steam supply is shut off. An inert gas such as nitrogen or carbon dioxide is then introduced above the mass to break the vacuum and exclude air. As the contents of the cooker cools a separation occurs, the oil rising to the top while the disintegrated solids settle beneath an intermediate layer of water. When the separation is complete the oil is decanted and conveyed under the inert gas to a refrigerated tank from which air is excluded. The oil is then chilled sufficiently to cause the precipitation of stearin and the product is filter-pressed to remove the stearin. From the filter the oil passes to storage tanks. In the filter and storage tanks an atmosphere of inert gas is maintained constantly in contact with the oil and throughout the handling of the oil contact of air therewith is prevented. The apparatus for performing the process of this invention is shown diagrammatically in the accompanying drawing. In this drawing numeral 10 designates the cooker into the top 11 of which the oil-containing material is charged. The steam for cooking the material is introduced from a suitable source, not shown, by way of pipe 12, while a vacuum is maintained in cooker 10 by means of vacuum pump 13, which is connected thereto by pipe 14. Suitable valves 15 and 16 control the steam and vacuum lines, respectively.

After the cooking process described heretofore is complete, the vacuum is broken in cooker 10 by admitting an inert gas into cooker 10 from gas storage container 17 by way of pipes 18 and 19, pipe 19 being controlled by valve 20.

After the mass in cocker 10 has cooled, the oil separates and collects in a layer at the surface of the mass. This oil is drawn off of the surface of the mass by means of pump 21 by way of pipe 22 projecting part way into cooker 10, and is discharged into refrigerator 23 which is cooled by coils 24 supplied with brine or the like from a refrigerating machine not shown. This chilling of the oil causes the separation of stearin, and after the oil has been sufficiently cooled it is allowed to flow into filter press 25 by opening valve 26' in pipe 27'. The press is operated in an atmosphere of inert gas supplied by pipes 26 and 27, which are controlled by valves 28 and 29, respectively. The solid stearin is subsequently removed in cake form from filter press 25, while the oil is conducted through pipe 30 into a suitable cask or storage tank 31, the oil being sealed or stored therein in an atmosphere of inert gas which is introduced by pipe 32 controlled by valve 33.

While the apparatus described is diagrammatic and shows particular form of apparatus and arrangement thereof, it is to be understood that such other apparatus as will perform the process of the invention may be used if desired.

As the result of the operation as described an oil is obtained which has a much higher content of vitamins than is usually obtained from similar sources. The amount of vitamins in the product will vary, of course, with the source of the oil, the season and other factors, but the improved method permits maximum recovery of these important elements. The product has, therefore, a higher value as a medicine and food than the oils which have been available heretofore.

Oils such as those described also contain organic iodine compounds which have therapeutic value. These compounds are also preserved by observing the precautions herein described.

It is of vital importance to the successful operation of the method that the oil-containing material shall not be subjected to the action of oxygen at temperatures above 105° C. during the cooking and that contact of air with the extracted oil shall be avoided subsequent to the rendering thereof. The method described is adapted to accomplish these results. Various changes may be made in the details of the invention without departing therefrom or sacrificing the advantages thereof.

I claim:

1. The method of extracting vitamin bearing oils from fish livers containing such oils without substantial reduction in the vitamin content, which comprises cooking the livers at a temperature not exceeding 100° C. while under sub-atmospheric pressure until the livers are disintegrated and the oil freed therefrom, then introducing an inert gas above the mass to break the vacuum and exclude air, subsequently cooling the mass while permitting it to separate into strata, and decanting the upper strata of oil and storing it under an inert gas.

2. The method of extracting vitamin bearing oils from fish livers containing such oils without substantial reduction in the vitamin content, which comprises cooking the livers at a temperature not exceeding 105° C. while under sub-atmospheric pressure until the livers are disintegrated and the oil freed therefrom, then introducing an inert gas above the mass to break the vacuum and exclude air, subsequently cooling the mass while permitting it to separate into strata, and decanting the upper strata of oil and storing it under an inert gas.

3. A method for the substantial preservation of the vitamin content in vitamin-containing oils during the production of such oil from fish livers which comprises cooking the material in a closed vessel under reduced pressure at a temperature of approximately 100° C., then introducing an inert gas into the cooking vessel and allowing the mixture to cool, decanting the separated oil while under an inert gas and storing the oil under an inert gas.

In testimony whereof I affix my signature.

FERDINAND W. NITARDY.